United States Patent
Fujita et al.

(10) Patent No.: US 10,557,002 B2
(45) Date of Patent: Feb. 11, 2020

(54) RESIN COMPOSITION FOR FIBER-REINFORCED PLASTIC, CURED PRODUCT THEREOF, FIBER-REINFORCED PLASTIC CONTAINING SAID CURED PRODUCT, AND METHOD FOR PRODUCING FIBER-REINFORCED PLASTIC

(71) Applicant: ADEKA CORPORATION, Tokyo (JP)

(72) Inventors: Naohiro Fujita, Kuki (JP); Kazuhide Morino, Kuki (JP); Tasuku Aoki, Kuki (JP); Tomoko Kimura, Kuki (JP); Masato Inadome, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 39 days.

(21) Appl. No.: 15/757,086

(22) PCT Filed: Aug. 25, 2016

(86) PCT No.: PCT/JP2016/074758
§ 371 (c)(1),
(2) Date: Mar. 2, 2018

(87) PCT Pub. No.: WO2017/038603
PCT Pub. Date: Mar. 9, 2017

(65) Prior Publication Data
US 2018/0251612 A1 Sep. 6, 2018

(30) Foreign Application Priority Data

Sep. 4, 2015 (JP) ................................. 2015-174653
Oct. 23, 2015 (JP) ................................. 2015-208947

(51) Int. Cl.
| | |
|---|---|
| B32B 27/38 | (2006.01) |
| B32B 27/26 | (2006.01) |
| C08G 59/22 | (2006.01) |
| C08G 59/24 | (2006.01) |
| C08G 59/50 | (2006.01) |
| C08L 63/00 | (2006.01) |
| C08J 5/24 | (2006.01) |
| C08J 5/04 | (2006.01) |
| C08G 59/40 | (2006.01) |
| C08J 3/28 | (2006.01) |

(52) U.S. Cl.
CPC .............. *C08J 5/046* (2013.01); *C08G 59/22* (2013.01); *C08G 59/40* (2013.01); *C08G 59/50* (2013.01); *C08G 59/5033* (2013.01); *C08J 5/04* (2013.01); *C08J 3/28* (2013.01)

(58) Field of Classification Search
None
See application file for complete search history.

(56) References Cited

U.S. PATENT DOCUMENTS

| | | | |
|---|---|---|---|
| 7,709,582 B2 | 5/2010 | Kouchi et al. | |
| 2004/0247882 A1 | 12/2004 | Kouchi et al. | |
| 2008/0108761 A1 | 5/2008 | Kouchi et al. | |
| 2010/0151137 A1 | 6/2010 | Kouchi et al. | |
| 2010/0227170 A1* | 9/2010 | Endo ...................... C08L 63/00 428/413 |
| 2011/0049426 A1* | 3/2011 | Patel ...................... C08L 63/00 252/299.01 |
| 2012/0309923 A1 | 12/2012 | Ogawa et al. | |
| 2016/0304684 A1* | 10/2016 | Ellinger .................... C08J 5/24 |
| 2018/0361685 A1* | 12/2018 | Fujita ...................... B29C 70/06 |

FOREIGN PATENT DOCUMENTS

| | | | |
|---|---|---|---|
| CN | 102153724 A | 8/2011 | |
| DE | 102014019207 A1 * | 6/2016 | .............. C08L 79/04 |
| JP | 2007-154160 A | 6/2007 | |
| JP | 2009221453 A | 10/2009 | |
| JP | 2010-150310 A | 7/2010 | |
| JP | 2010-180352 A | 8/2010 | |
| JP | 2011-46825 A | 3/2011 | |
| JP | 2013-91728 A | 5/2013 | |
| WO | 03/040206 A1 | 5/2003 | |

OTHER PUBLICATIONS

Machine translation of DE-102014019207-A1 (no date).*
Supplementary EP search report un EP16841635 dated Mar. 27, 2019 (pp. 1-3).
Chemical Book: information sheet: 4,4'-Diamino-3,3'-Dimethyldiphenylmethane ; CAS:838-88-0 retrieved from internet [https://www.chemicalbook.com/ProductChemicalPropertiesCB5342200_EN.htm] on Apr. 18, 2019.
International Search Report dated Nov. 1, 2016 issued in corresponding PCT/JP2016/074758 application (2 pages).
English Abstract of JP 08-225667 A published Sep. 3, 1996.
English Abstract of JP 2007-154160 A published Jun. 21, 2007.

(Continued)

*Primary Examiner* — Michael J Feely
(74) *Attorney, Agent, or Firm* — Millen, White, Zelano & Branigan, PC (57) ABSTRACT

A resin composition for fiber reinforced plastic which is a resin composition comprising an epoxy resin (A), a cyanate resin (B) and a liquid aromatic amine curing agent (C), and, as necessary, further an active energy radiation absorbable component (D), wherein 20 to 100 percent by mass of the aforementioned epoxy resin (A) is an epoxy compound expressed by the following general formula (1), a cured product obtained by curing a composition containing said resin composition and a high-strength fiber-reinforced plastic;

(1)

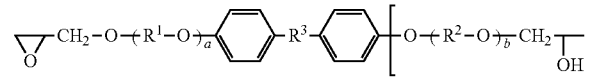

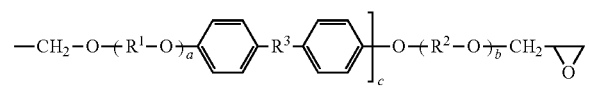

wherein (a) and (b) each independently express an integer from 2 to 10, (c) expresses an integer from 0 to 3, $R^1$ and $R^2$ each independently express a bivalent hydrocarbon group having 2 to 5 carbon atoms, and $R^3$ expresses a single bond, a methylene group or —$C(CH_3)_2$—.

15 Claims, 2 Drawing Sheets

(56) References Cited

OTHER PUBLICATIONS

English Abstract of JP 2010-150310 A published Jul. 8, 2010.
English Abstract of JP 2010-180352 A published Aug. 19, 2010.
English Abstract of JP 2011-046825 A published Mar. 10, 2011.
English Abstract of CN 102153724 A published Aug. 17, 2011.
English Abstract of JP 2013-091728 A published May 16, 2013.

* cited by examiner

RESIN COMPOSITION FOR FIBER-REINFORCED PLASTIC, CURED PRODUCT THEREOF, FIBER-REINFORCED PLASTIC CONTAINING SAID CURED PRODUCT, AND METHOD FOR PRODUCING FIBER-REINFORCED PLASTIC

TECHNICAL FIELD

The present invention relates to a resin composition for fiber-reinforced plastic, a cured product thereof and a fiber-reinforced plastic using the resin composition, and in particular relates to a resin composition having good impregnating properties to reinforcement fiber, good rapid curing properties and good high-strength properties, obtained by using an epoxy resin having excellent flexibility, a cyanate resin, and an aromatic amine as a curing agent, a fiber-reinforced plastic comprising a cured product of said composition, and a method for producing said fiber-reinforced plastic.

BACKGROUND ART

A method for producing a molded material by using a reinforcing material, such as thermosetting epoxy resin, unsaturated polyester resin, polyamide resin, or phenol resin, for fiber materials such as carbon fiber and glass fiber is well known. The fiber-reinforced plastic obtained by using this method is extensively used for a material of structures such as an airplane and a ship, and sporting goods such as a tennis racket and a golf club. The epoxy resin used as a reinforcing material, which is not only excellent in adhesive properties, heat resistance and chemical resistance, but also is inexpensive, is often used as a well balanced material.

The epoxy resin composition has an excellent electric performance and adhesive properties. However, in cases where sufficient heat resistance can not be obtained by using a conventional epoxy resin, a cyanate-epoxy composite resin composition having high heat resistance, which is obtained by further blending with a cyanate resin, is often used for a sealing material of a semiconductor, or for molding of electronic circuit substrate etc.

With regard to a method for curing by using epoxy resin and cyanate resin, it is known that a cured product for sealing a semiconductor which has a high glass-transition temperature, low water absorption coefficient and good adhesive properties can be obtained by using phenol-modified resin as a curing agent (for example, Patent document 1 etc.). However, in cases of using this method, although adhesive properties and heat resistance of a cured product are good, there is a disadvantage in that, since the stretch displacement of the cured product is low, the cured product cannot adapt to the fiber's stretch when it is applied to a fiber material, and as a result, an internal peel-off is caused.

In addition, a method for producing a cyanate-epoxy composite resin composition is known that has excellent storage stability and curing properties and also is suitable for a sealing agent or an adhesive agent for a semiconductor, by carrying out the curing reaction, using a latent curing agent which is obtained by reacting an epoxy compound with a polyamine compound (for example, Patent document 2 etc.). However, in this method a powdery latent curing agent is used, therefore, there is a disadvantage in that, when the resin composition is applied to a fiber material, the curing agent cannot permeate into the inside of the fiber, and as a result, the curing is not carried out enough.

Furthermore, with regard to a method which can rapidly carry out a curing reaction of an epoxy resin with a cyanate resin, a method using an adhesive agent which can bond resin materials in a short time is known, wherein a laser beam is irradiated to a composition which contains a latent curing agent obtained by reacting polyamine with epoxy resin, together with a light-absorbing component (for example, Patent document 3 etc.). This method is a method which can realize a bonding in a shorter time compared to conventional thermal curing by using resin materials having light transmission properties and transmitting a laser beam to the inside of the adhesion part. However, in the case of being applied as a composition for fiber-reinforced plastic, there is a disadvantage in that, since a latent curing agent used as a curing agent, and a light-absorbing component are solid powder, a latent curing agent and a light-absorbing component remain on the surface without permeating into the inside gap existing among fibers, therefore, curing of resin in the inside gap among fibers becomes insufficient.

PRIOR ART DOCUMENTS

Patent Document

Patent document 1: JP 2005-506422 A
Patent document 2: International Publication 2009-001658 A
Patent document 3: JP 2010-180352 A

SUMMARY OF THE INVENTION

Problems to be Solved by the Invention

Therefore, the first object of the present invention is to provide a resin composition having high stretch displacement, excellent heat resistance and flexibility, which is suitable for improving the strength of fiber material.

The second object of the present invention is to provide a fiber-reinforced plastic having excellent heat resistance and strength.

In addition, the third object of the present invention is to provide a method for producing a fiber-reinforced plastic by curing the above resin composition in a short time.

Means for Solving the Problems

As a result of extensive studies, the inventors of the present invention have found that a resin composition, obtained by combining a specific epoxy resin having a polyalkylene ether structure, a cyanate resin, and a liquid aromatic amine curing agent, can easily permeate into gaps existing among fibers, and becomes a fiber-reinforced resin composition having excellent heat resistance and flexibility; and also have found that, in the case of combining an active energy radiation absorbable component having excellent compatibility with the epoxy resin, a fiber-reinforced plastic can be produced in a short time by irradiating active energy radiation, thereby achieving the present invention.

Namely, the present invention is a resin composition for fiber-reinforced plastic comprising: an epoxy resin (A), a cyanate resin (B) and an aromatic amine curing agent which is a liquid at 25° C. (C), wherein 20 to 100 percent by mass of the epoxy resin (A) is the epoxy compound expressed by the following general formula (1); a cured product obtained by curing a composition which contains said resin composition; a high-strength fiber-reinforced plastic which uniformly contains said cured product and reinforcement fiber; and a method for producing said high-strength fiber-reinforced plastic.

(1)

wherein a and b each independently express an integer from 2 to 10, c expresses an integer from 0 to 3, $R^1$ and $R^2$ each independently express a bivalent hydrocarbon group having 2 to 5 carbon atoms, and $R^3$ expresses a single bond, a methylene group or $-C(CH_3)_2-$.

From the viewpoint of producing a fiber-reinforced plastic in a short time, it is preferable that the composition of the present invention further contains an active energy radiation absorbable component as the component (D).

From the viewpoint of improving adhesion properties of the cured product to the fiber, it is preferable in the resin composition of the present invention that 3 to 15 percent by mass of the aforementioned epoxy resin (A) is a dicyclopentadiene epoxy resin.

In addition, it is preferable that the cyanate resin (B) is at least one compound selected from a group consisting of compounds expressed by the after-mentioned general formulae from (2-1) to (2-3) and prepolymers thereof, and it is also preferable that the amount of cyanate resin (B) used is 50 to 120 parts by mass relative to the total amount of epoxy compounds, that is 100 parts by mass, which are all compounds having an epoxy group in the resin composition.

Furthermore, it is preferable that the aromatic amine curing agent (C), which is liquid at 25° C., is at least one compound selected from diamino diphenylmethane, diamino dimethyldiphenylmethane and diamino diethyl toluene, and also it is preferable that the amount used thereof is 40 to 90 parts by mass relative to 100 parts by mass of the epoxy compounds which corresponds to all of compounds having the epoxy group in the resin composition.

From the viewpoint of improving adhesion properties of the cured product to the fiber, it is preferable that the resin composition of the present invention further contains a silane coupling agent and also it is preferable that the amount used thereof is 7 to 20 parts by mass relative to 100 parts by mass of the total amount of the epoxy compound having an epoxy group in the resin composition.

Moreover, when using the active energy radiation absorbable component (D), it is preferable that said component is a nigrosine compound and also it is preferable that the amount used thereof is 0.001 to 1 percent by mass relative to the total amount of the resin composition. The composition of the present invention which contains the component (D) cures rapidly by irradiating active energy radiation. It is preferable that the active energy radiation used in this case is laser beam and/or infrared ray.

Effect of the Invention

The resin composition of the present invention has excellent heat resistance and also the cured product thereof has high stretch displacement and excellent flexibility. Therefore, in the case of applying the resin composition of the present invention to a fiber material, adhesion properties thereof to the fiber are excellent. Accordingly, the fiber-reinforced plastic of the present invention having excellent heat resistance and strength can be easily obtained by applying the resin composition of the present invention to fibers. In addition, the composition of the present invention can be cured by irradiating the active energy radiation, therefore, the fiber-reinforced plastic having the aforementioned performances can be obtained in a quite short time compared to the conventional curing method using heat.

MODES FOR CARRYING OUT THE INVENTION

It is necessary that an epoxy resin (A) used in the present invention contains at least 20 percent by mass of epoxy compound expressed by the following general formula (1).

(1)

wherein (a) and (b) each independently indicate an integer from 2 to 10, (c) indicates an integer from 0 to 3, $R^1$ and $R^2$ each independently indicate a bivalent hydrocarbon group having 2 to 5 carbon atoms, and $R^3$ indicates a single bond, a methylene group, or $-C(CH_3)_2-$.

The amount used of the compound expressed by the aforementioned general formula (1) is 20 to 100 percent by mass of epoxy resin (A), however, in order to further improve the tensile stress of cured product, 30 to 80 percent by mass is preferable, but 40 to 60 percent by mass is even more preferable. When it is less than 20 percent by mass, although the strength of cured product is not negatively affected, the toughness of cured product is markedly decreased since the stretch displacement does not increase.

Compared to a cured product obtained by curing a bisphenol epoxy resin alone, a cured product obtained by reacting the compound expressed by the aforementioned general formula (1) or the epoxy resin containing the compound expressed by the aforementioned general formula (1) with curing agents has more flexible physical properties due to large stretch displacement, therefore, it can adapt to the stretch of fiber, even when the fiber material is used in combination, thus a high-strength fiber-reinforced plastic can be obtained.

In the case, wherein the resin composition of the present invention is used with a fiber material in combination, in order to adapt to the stretch of fiber, it is particularly preferable that the amount of the compound expressed by the aforementioned general formula (1) contained in the epoxy resin (A) is 40 to 95 percent by mass, but 60 to 90 percent by mass is even more preferable. When it is less than 20 percent by mass, the cured product cannot adapt to the stretch of fiber material and as a result, the cured product peels off from the fiber material, therefore, the tension strength of the fiber-reinforced plastic obtained decreases markedly.

In the aforementioned general formula (1), (a) and (b) each independently indicate an integer from 2 to 10. From the viewpoint of crosslink density of cured product, it is preferable that the average value of (a) and the average value of (b) are each independently a number from 3 to 7, but a number from 4 to 6 is even more preferable. When the average values of (a) and (b) are each independently less than 2, flexibility is markedly decreased since the crosslink density of cured product is excessively increased. In contrast, when the average values of (a) and (b) are each independently more than 10, the strength of cured product is markedly decreased since the crosslink density of cured product is decreased.

In the aforementioned general formula (1), (c) indicates an integer from 0 to 3. From the viewpoint of workability when used, it is preferable that the average value of (c) is a number from 0 to 2, but a number from 0 to 1 is even more preferable. When the average value of (c) is more than 3, workability is decreased since the viscosity of the resin is increased.

In addition, from the viewpoint of ready availability of raw materials, it is preferable that $R^1$ and $R^2$ in the aforementioned general formula (1) are each independently a bivalent hydrocarbon group having 2 to 4 carbon atoms, but a propylene group is especially preferable.

The method for producing the compound expressed by the aforementioned general formula (1) is not limited in particular. For example, an alkylene oxide addition product is prepared at first by carrying out an addition reaction of at least 2 equivalents of alkylene oxide, if necessary using a catalyst, with one equivalent of phenolic hydroxyl group (a hydroxyl group directly-bonded to an aromatic ring) of compound having two phenolic hydroxyl groups, such as bisphenol A, bisphenol F or biphenol. Then, an epichlorohydrin is reacted with the alkylene oxide addition product obtained, by using a catalyst and/or a solvent as necessary, so that the compound expressed by the aforementioned general formula (1) can be obtained.

Examples of the aforementioned alkylene oxide are ethylene oxide, 1,2-propylene oxide, 1,2-butylene oxide and 1,2-pentylene oxide. In the case of using 1,2-propylene oxide among them, $R^1$ and $R^2$ in the aforementioned general formula (1) are a propylene group.

With regard to the amount of alkylene oxide used, for example, when the alkylene oxide is 2 equivalents relative to one equivalent of phenolic hydroxyl group, the average values of (a) and (b) expressed by the aforementioned general formula (1) are each 2 in the theoretical value.

An acid catalyst or an alkali catalyst is included in the catalyst used for the addition reaction of the aforementioned alkylene oxide. Examples of acid catalyst are Bronsted acid such as sulfuric acid and phosphoric acid, and Lewis acid such as stannic chloride and boron trifluoride. Examples of alkali catalyst are tertiary amine, hydroxide of alkali metals such as sodium hydroxide and potassium hydroxide, hydroxide of quaternary ammonium such as ammonium hydroxide, hydroxide of alkali earth metal such as calcium hydroxide and barium hydroxide, and a carbonate of alkali metals such as potassium carbonate and sodium carbonate. From the viewpoint that a purification process after the reaction is finished is convenient, it is preferable to use the alkali catalyst among these, and it is more preferable to use the hydroxide of alkali metal or alkali earth metal, but it is most preferable to use the hydroxide of alkali metal. These catalysts may be each independently used, or more than two kinds of them may be used together.

Phase-transfer catalysts such as tetrabutylammonium salt, trioctylmethylammonium salt and benzyl dimethyl octadecylammonium salt are included in the catalyst used for reacting the aforementioned epichlorohydrin, as well as the catalysts referred in the addition reaction of the alkylene oxide. In the present invention, from the viewpoint that a purification process after the reaction is finished is convenient, it is preferable to use the alkali catalyst among these, and it is more preferable to use the hydroxide of alkali metal or alkali earth metal, but it is most preferable to use the hydroxide of alkali metal. These catalysts may be used alone, or more than two of them may be used together.

Examples of the solvent used for the addition reaction of the aforementioned epichlorohydrin are, for example, ketone solvents such as acetone and methylethylketone, alcohol solvents such as methanol, ethanol, 1-propyl alcohol, isopropyl alcohol, 1-butanol, secondary butanol and tertiary butanol, cellosolve solvents such as methyl cellosolve and ethyl cellosolve, ether solvents such as tetrahydrofuran, 1,4-dioxane, 1,3-dioxane and diethoxyethane, and aprotic polar solvents such as acetonitrile, dimethyl sulfoxide and dimethylformamide. These organic solvents may be used alone, or more than two of them may be used together.

A necessary amount of epichlorohydrin used in the aforementioned reaction of the alkylene oxide addition product with epichlorohydrin, is 1 to 10 equivalents relative to 1 equivalent of hydroxyl group which is contained in the alkylene oxide addition product. After the reaction is finished, the epoxy compound expressed by the aforementioned general formula (1) can be obtained by removing the excess of epichlorohydrin. In this case, the closer the epichlorohydrin used gets to 10 equivalents, the closer the average value of (c) expressed in the aforementioned general formula (1) tends to get to 0. The closer the epichlorohydrin used gets to 1 equivalent, the closer the average value of (c) tends to go up to 3.

In the present invention, other than the epoxy compound expressed by the aforementioned general formula (1), other epoxy compounds can be used together as appropriate, as an epoxy resin (A). In this case, the molecular structure and molecular weight etc. of other epoxy compounds used are not limited in particular, and they can be selected as appropriate from publicly-known epoxy resins having at least two epoxy groups in a molecule. In the present invention, from a viewpoint of permeability into gaps of the fiber material, it is preferable to use an epoxy resin which is liquid at 25° C.

Examples of the aforementioned other epoxy compounds are, for example, bisphenol epoxy resins such as bisphenol A type epoxy resin and bisphenol F type epoxy resin; biphenyl type epoxy resin such as biphenyl type epoxy resin and tetramethyl biphenyl type epoxy resin; dicyclopentadiene type epoxy resin; naphthalene type epoxy resin; alicyclic epoxy resin obtained from cyclohexanedimethanol and hydrogenated bisphenol A etc.; epoxy compounds having glycidyl amino groups such as N,N-diglycidyl aniline, bis(4-(N-methyl-N-glycidyl amino)phenyl)methane and diglycidyl ortho-toluidine; epoxidized products of cyclic olefin compounds such as vinylcyclohexene diepoxide, (3,4-epoxycyclohexylmethyl) 3,4-epoxycyclohexane carboxylate, (3,4-epoxy-6-methylcyclohexylmethyl)6-methylcyclohexane carboxylate and bis(3,4-epoxy-6-methylcyclohexylmethyl)adipate; epoxidized conjugated diene polymers such as epoxidized polybutadiene and epoxidized styrene-butadiene copolymer; and a heterocyclic compound such as triglycidyl isocyanurate.

In the present invention, it is preferable to use bisphenol A type epoxy resin and/or bisphenol F type epoxy resin among these, from the standpoint of inexpensive availability.

Also, in the case of using the resin composition of the present invention together with a fiber material in combination, it is preferable to use dicyclopentadiene type epoxy resin, from the viewpoint that adhesion properties to fiber is improved. In that case, it is preferable that the amount of dicyclopentadiene type epoxy resin used is 0.1 to 30 percent by mass in the epoxy resin of component (A), but 3 to 15 percent by mass is even more preferable.

It is preferable that the epoxy equivalent of epoxy resin (A) used in the present invention is 70 to 3000, but 100 to 2000 is even more preferable. It is difficult to obtain an epoxy resin of which epoxy equivalent is less than 70, and as a result, it is difficult to use. As for the epoxy resin of which equivalent is more than 3000, since the crosslink density of resin composition is decreased, physical properties remarkably tend to decrease.

In the present invention, a reactive diluent may be used together in order to adjust a viscosity of the reaction mixture to the desired viscosity. When curing the epoxy resin composition of the present invention, from the viewpoint of suppressing the deteriorations of heat resistance as well as a glass-transition temperature of the cured product, it is preferable to use a reactive diluent having at least one epoxy group.

Examples of the reactive diluent having one epoxy group are, for example, n-butylglycidylether, $C_{12}$-$C_{14}$alkyl glycidylether, allylglycidylether, 2-ethylhexylglycidylether, styrene oxide, phenylglycidylether, cresylglycidylether, p-sec-butylphenylglycidylether, t-butylphenylglycidylether, glycidylmethacrylate and tertiary carboxylicacid glycidylester.

Examples of the reactive diluent having two epoxy groups are, for example, ethylene glycol diglycidylether, propylene glycol diglycidylether, butanediol diglycidylether, 1,6-hexanediol diglycidylether and neopentyl glycol diglycidylether.

Furthermore, examples of the reactive diluent having three epoxy groups are trimethylolpropane triglycidylether and glycerin triglycidylether.

The molecular structure and molecular weight etc. of cyanate resin (B) used in the present invention are not limited in particular. They can be selected as appropriate from publicly-known cyanate resins. In the present invention, it is especially preferable to use a cyanate resin having at least two cyanate groups (OCN) in a molecule. For example, a compound expressed by the following general formulae (2-1), (2-2) and prepolymers thereof are preferable.

$$NCO—R^b—R^a—R^c—OCN \quad (2)$$

wherein, $R^a$ indicates a bivalent hydrocarbon group, $R^b$ and $R^c$ each independently indicate an unsubstituted phenylene group or a phenylene group substituted by 1 to 4 alkyl groups.

(2-2)

wherein, (n) indicates an integer from 1 to 10, $R^d$ is a hydrogen atom, or an alkyl group having 1 to 4 carbon atoms.

Among compounds mentioned above, from the viewpoint of workability, it is more preferable to use the compound indicated in the general formula (2-1), but it is even more preferable that said compound is the compound indicated in the following general formula (2-3).

(2-3)

wherein $R^e$ indicates a single bond, a methylene group, —CH(CH$_3$)—, —C(CH$_3$)$_2$—, or any one of functional groups indicated by the following general formulae from (3-1) to (3-8), $R^f$, $R^g$, $R^h$ and $R^i$ each independently indicate a hydrogen atom, or an alkyl group having 1 to 4 carbon atoms.

(3-1)

(3-2)

(3-3)

(3-4)

(3-5)
(3-6)
(3-7)
(3-8)

wherein (m) indicates an integer from 4 to 12.

It is preferable that the amount of cyanate resin (B) used in the present invention is 10 to 200 parts by mass relative to 100 parts by mass of the total amount of epoxy compound containing the epoxy group used in the present invention, but 30 to 150 parts by mass is more preferable and 50 to 120 parts by mass is optimal. When it is less than 10 parts by mass, the strength of the resin composition is not improved. When it is more than 200 parts by mass, adhesion properties of the resin composition to a base material remarkably tend to deteriorate.

A liquid aromatic amine curing agent (C) used in the present invention is required to be liquid at 25° C. so as to easily permeate into the gaps existing among fiber materials, and particularly it is required to be a compound which has an amino group directly bonded with an aromatic ring. Examples of such compounds are, for example, methaphenylenediamine, diaminodiphenylmethane, thaminodimethyldiphenylmethane, diaminodiethyldiphenylmethane, diaminodiethyltoluene, 1-methyl-3,5-bis(methylthio)-2,4-benzenediamine and 1-methyl-3,5-bis(methylthio)-2,6-benzenediamine.

In the present invention, from the viewpoint of improving the heat resistance of cured product, it is preferable to use diaminodiphenylmethane, diaminodiethyldiphenylmethane or diaminodiethyltoluene among these curing agents, but it is even more preferable to use diaminodiethyldiphenylmethane.

In the present invention, it is preferable that the blending amount of the aromatic amine curing agent (C) ranges from 20 to 100 parts by mass relative to 100 parts by mass of the total amount of compounds having the epoxy group, but 40 to 90 parts by mass is even more preferable. When it is less than 20 parts by mass or when it is more than 90 parts by mass, it becomes difficult that the epoxy resin composition is perfectly cured.

The resin composition of the present invention can be cured by heating, however, when it contains an active energy radiation absorbable component (D), it is possible to shorten the curing time by irradiating the active energy radiation. By shortening the curing time, working hours are shortened, moreover, the energy used for the curing is decreased compared with the energy consumed for curing by heat, that is, the curing method using the active energy radiation has an economical merit and also it is advantageous from an environmentally-friendly standpoint.

The aforementioned active energy radiation is not limited in particular. It can be selected as appropriate depending on purposes. Examples of this active energy radiation are, for example, an electron beam, ultraviolet rays, infrared rays, a laser beam, a visible ray, ionizing radiations (a X-ray, an alpha ray, a beta ray, a gamma ray etc.), a microwave and a high-frequency wave.

In the present invention, from the viewpoint of further improving the curing speed, it is preferable to use a laser beam and/or infrared rays among the active energy radiation, but it is even more preferable to use infrared rays.

Examples of the laser which emits the aforementioned laser beam are a solid-state laser wherein ruby, glass or YAG (a crystalline body obtained by adding a small amount of rare earth to yttrium, aluminum and garnet) is used as a medium; a liquid laser wherein a substance obtained by dissolving pigment in solvents such as water and alcohol is used as a medium; a gas laser wherein $CO_2$, argon or He—Ne mixture gas etc. are used as a medium; and a semiconductor laser wherein a recombination luminescence in a semiconductor is used. In the present invention, it is preferable to use the semiconductor laser which is inexpensive and also easily-controlled in the output power.

The wavelength of laser beam used in the present invention is not limited in particular. For example, if it is within the near infrared range (the wavelength range from 0.7 to 2.5 μm), a resin composition can be cured.

The output power of laser beam is also not limited in particular. For example, if it is within 1 W to 4 kW, a resin composition can be cured.

The time length of laser irradiation is not limited in particular. However, it varies depending on the irradiated area and output power. For example, if it is within the range from 0.2 $W/mm^2$ to 10 $W/mm^2$, a resin composition can be cured.

The wavelength of infrared rays by which the resin composition of the present invention can be cured is also not limited in particular. For example, wavelengths in any range such as the near infrared range (the wavelength range from 0.7 to 2.5 μm), the middle infrared range (the wavelength range from 2.5 to 4 μm) and the far infrared range (the wavelength range from 4 to 1000 μm) can cure the resin composition.

An example of a method for irradiating the infrared rays by which the resin composition of the present invention can be cured is a method for irradiating by using an infrared heater. Examples of the infrared heater are, for example, a halogen heater, a quartz heater, a sheathed heater and a ceramic heater etc. The halogen heater can irradiate infrared rays having wavelengths from the near infrared range to the middle infrared range. The quartz heater, sheathed heater and ceramic heater can irradiate infrared rays having wavelengths from the middle infrared range to the far infrared range as well. Among these, it is preferable to use the halogen heater for the reason that the time until the heat source is heated after turning on the power is short and the rapid heating is possible.

The wavelength of infrared ray which can cure the resin composition of the present invention is not limited in particular. However, depending on absorption areas of active energy radiation absorbable component used, various wavelength ranges can be used. For example, in the case of using a nigrosine compound, it is possible to cure the resin composition of the present invention for a short time by irradiating the near infrared light (the wavelength is approximately 0.7 to 2.5 μm).

The active energy radiation absorbable component (D) which is contained in the resin composition of the present invention is a component that can absorb the aforementioned active energy radiation to emit heat energy which can cure the resin composition of the present invention. From the viewpoint of impregnating the resin composition into gaps existing among fibers, it is preferable that such an active energy radiation absorbable component is liquid at 25° C., or, when mixed with other materials, is compatible so as to become liquid. Examples of such compounds are aniline black, a metallic complex, a squaric acid derivative, an immonium dye, polymethine, a phthalocyanine compounds, a naphthalocyanine compounds, a perylene compounds, a quoterrylene compounds and a nigrosine compounds. In the present invention, from an easily obtainable standpoint, it is more preferable to use the nigrosine compounds among these compounds.

Examples of a commercially available nigrocine compound are BONASORB series, eBIND ACW series, eBIND LTW series, eBIND LAW series, ORIENT NIGROSINE series and NUBIAN BLACK series, which are manufactured by Orient Chemical Industries Co., Ltd. In the present invention, from an inexpensively and easily obtainable standpoint, it is preferable to use the NUBIAN BLACK series among these nigrosine compounds. In these nigrosine compounds, one of them may be used alone, or two or more of them may be used together.

The blending amount of active energy radiation absorbable component (D) used for the resin composition of the present invention should be within the range from 0.001 to 1 percent by mass relative to the total amount of the resin composition. Adding the standpoint of balance of curing speed and heat generation (burning of the composition) in the resin composition, it is preferable that the blending amount is from 0.01 to 0.5 percent by mass, but 0.05 to 0.2 percent by mass is even more preferable. When it is less than 0.001 percent by mass, the amount of the heat, which was generated in the resin composition by irradiating the active energy radiation is not sufficient, therefore, it is difficult for the resin composition to be cured completely. When it is more than 1 percent by mass, the active energy radiation is almost absorbed at the surface of the resin composition and only the surface of the resin composition is carbonized, therefore, the active energy radiation cannot reach to the inside of the composition. Thus, it is difficult for the resin composition to be completely cured inside.

Additive agents may be further used together for the resin composition of the present invention, if necessary. Examples of the aforementioned additive agents are, for example, nonreactive diluents (plasticizers) such as dioctyl phthalate, dibutyl phthalate, benzyl alcohol and coal tar; pigment; silane coupling agents such as γ-aminopropyl triethoxysilane, N-β-(aminoethyl)-γ-aminopropyl triethoxysilane, N-β-(aminoethyl)-N'-β-(aminoethyl)-γ-aminopropyl triethoxysilane, γ-anilinopropyl triethoxysilane, γ-glycidoxypropyl triethoxysilane, β-(3,4-epoxycyclohexyl)ethyl triethoxysilane, vinyltriethoxysilane, N-β-(N-vinylbenzylaminoethyl)-γ-aminopropyl triethoxysilane, γ-methacryloxypropyl triethoxysilane, γ-chloropropyl trimethoxysilane, γ-mercaptopropyl trimethoxysilane and γ-isocyanatopropyl triethoxysilane;

Titanium coupling agents such as isopropyl triisostearoyl titanate, isopropyltri-n-dodecylbenzene sulfonyl titanate, isopropyltris(dioctyl pyrophosphate)titanate, tetraisopropylbis(dioctyl phosphite)titanate, tetraoctylbis(ditridecyl phosphite)titanate, tetra(2,2'-diallyloxymethyl-1-butyl)bis(di-tridecyl) phosphite titanate, bis(dioctylpyrophosphate) oxyacetate titanate, bis(dioctylpyrophosphate)ethylene titanate, isopropyltrioctanoyl titanate, isopropydimethacryloyl isostearoyl titanate, isopropylisostearoyl diacryloyl titanate, isopropyltri(dioctylphosphate)titanate, isopropyltricumylphenyl titanate, isopropyltri(N-aminoethyl-aminoethyl)titanate, tetraisopropyl titanate, tetra normal butyl titanate, butyltitanate dimmer, tetrakis(2-ethylhexyl)titanate, tetrastearyl titanate, tetramethyl titanate, diethoxybis(acetylacetonato)titanium, diisopropylbis(acetylacetonato)titanium, diisopropoxybis(ethylacetoacetate)titanium, isopropoxy(2-ethyl-1,3-hexanediolato)titanium, di(2-ethylhexoxy)bis(2-ethyl-1,3-hexanediolato)titanium, di-n-butoxybis(triethanolaminato)titanium, tetraacetylacetonate titanium, hydroxybis(lactato)titanium, dicumylphenyloxyacetate titanate and diisostearoyl ethylene titanate;

Zirconium coupling agents such as zirconium tributoxy stearate, tetra(2,2-diallyloxymethyl)butyldi(ditridecyl)phosphite zirconate, neopentyl(diallyl)oxytri neodecanoyl zirconate, neopentyl(diallyl)oxytri(dodecyl) benzene-sulfonyl zirconate, neopentyl(diallyl)oxytri(dioctyl) phosphite zirconate, neopentyl(diallyl)oxytri(dioctyl)pyrophosphate zirconate, neopentyl(diallyl)oxytri(N-ethylenediamino)ethyl zirconate, neopentyl(diallyl)oxytri(m-amino)phenyl zirconate, neopentyl(diallyl)oxytrimethacryloyl zirconate, neopentyl(diallyl)oxytriacryloylzirconate, dineopentyl(diallyl) oxydi paraaminobenzoyl zirconate, dineopentyl(diallyl) oxydi(3-mercapto)propyl zirconate, tetranormalpropoxy zirconium, tetranormalbutoxy zirconium, zirconium 2,2-bis(2-propenolate methyl)butylate, zirconium tetraacetyl acetonate, zirconium tributoxy acetyl acetonate, zirconium dibutoxybis(acetylacetonate), zirconium tributoxyethyl acetoacetate and zirconium monobutoxy acetylacetonatebis(ethylacetoacetate);

Lubricant agents such as candelilla wax, carnauba wax, Japan tallow, insects wax, bees wax, lanolin, spermaceti, montan wax, petroleum wax, fatty acid wax, fatty acid ester, fatty acid ether, aromatic ester and aromatic ether; a thickening agent; a thixotropic agent; an antioxidant; a light stabilizer; an ultraviolet absorber; a flame retardant; an antifoaming agent; and an antirust agent. These are usual additive agents.

In the present invention, among the aforementioned additive agents, from the viewpoint of improving adhesion properties to the fiber, it is preferable to add a silane coupling agent, and it is more preferable to add the γ-aminopropyl triethoxysilane and/or the γ-glycidoxypropyl triethoxysilane, since these compounds can be obtained easily and cheaply. In the present invention it is most preferable to add the γ-glycidoxypropyl triethoxysilane.

It is preferable that the blending amount of the aforementioned silane coupling agent ranges from 0.1 to 50 parts by mass relative to 100 parts by mass of the total amount of compound having an epoxy group. From the viewpoints of the good miscibility with resin and of improving adhesion properties to the fiber, it is particularly preferable to blend 7 to 20 parts by mass.

The resin composition of the present invention is excellent as a matrix resin of fiber-reinforced plastic wherein carbon fiber or glass fiber etc. is used as reinforced fiber. Sorts of the aforementioned reinforced fiber are not limited in particular. For example, carbon fiber, glass fiber, aramid fiber, boron fiber, alumina fiber and silicone carbide fiber etc. may be used alone, or may be used as a hybrid fiber wherein two or more fibers of them are combined.

Examples of a form of the aforementioned reinforced fiber are a so-called tow sheet obtained by arranging high strength and high-modulus fiber in one direction, an unidirectional woven fabric and a bi-directional woven fabric wherein the aforementioned fiber filaments are arranged in one direction or in two directions, a triaxial woven fabric wherein the aforementioned fiber filaments are arranged in three directions, and a multiaxial woven fabric wherein the aforementioned fiber filaments are arranged multidirectionally. In order to improve resin-impregnating properties to a base material, it is preferable in the tow sheet to arrange the aforementioned fibers so as to secure proper gaps between strands.

A method for shaping a fiber-reinforced plastic using the resin composition of the present invention is not limited in particular. For example, an extrusion molding method, a blow molding method, a compression molding method, a vacuum molding method, an injection molding method, a RTM (Resin Transfer Molding) method, a VaRTM (Vacuum assist Resin Transfer Molding) method, a laminate molding method, a hand lay-up molding method and a filament winding molding method are cited.

The fiber-reinforced plastic obtained by using the resin composition of the present invention can be utilized for various purposes. Examples of utilization are a structural material of movable bodies such as an automobile, a ship and a railroad vehicle, utilization for general industries such as a drive shaft, a plate spring, a windmill blade, a pressure container, a flywheel, a papermaking roller, a roof material, a cable and a material for repair and reinforcement; a material for aerospace industries such as an airplane body, a main wing, a tail wing, a moving blade, a fairing, a cowl, a door, a seat, an interior material, a motor case and an antenna; a material of sporting goods such as a golf shaft, a fishing rod, a racket of tennis and badminton, a hockey stick and a ski pole.

EXAMPLE

Now, the present invention will be illustrated in greater detail by reference to Examples and Comparative examples. Also, unless otherwise specified, "percent" refers to "percent by mass".

Example 1

80 g of ADEKA RESIN EP-4901E (bisphenol F type epoxy resin manufactured by ADEKA CORPORATION, epoxy equivalent: 170 g/eq) as an epoxy resin (A), 60 g of ADEKA RESIN EP-4005 (an epoxydized material of an addition product obtained by adding an average of 5 equivalent of propylene oxide to bisphenol A (a compound wherein the average values of (a) and (b) in the structural formula of general formula (1) correspond to 5 respectively), manufactured by ADEKA CORPORATION, epoxy equivalent: 510 g/eq), 60 g of LECy (1,1-bis(4-cyanatophenyOethane manufactured by Lonza Co., Ltd) as a cyanate resin (B), and 70 g of KAYAHARD AA (diaminodiethyldiphenyl methane manufactured by Nippon Kayaku Co., Ltd.) as an aromatic amine cured product (C) that is liquid at 25° C. were introduced in a 500 ml disposable cup to stir with a spatula at 25° C. for 5 minutes. After that, further stirring was carried out using a sun-and-planet stirring machine to obtain a mixture.

<Method for Measuring Usable Time>

100 g of the aforementioned mixture was stored in a 500 ml glass bottle to conduct a still-standing treatment at 23° C. for 55 hours. After that, the aforementioned glass bottle was overturned to confirm whether there is fluidity in the mixture or not, and the evaluation of "good" or "poor" was made.

Good: fluid and available

Poor: non-usable for the reason that the mixture did not move from the beginning position, even when 10 seconds passed after the glass bottle was overturned The aforementioned mixture was heated at 80° C. for 5 hours. Then it was further heated at 150° C. for 2 hours to cure. With respect to a cured product obtained, a bend test, a tensile test and a compression test were carried out to make an evaluation. Respective test methods were shown as below.

<Bend Test Method>

Using a cured product, a test piece was manufactured according to the method based on the JIS K 7171 to measure a maximum point stress, a strain at the maximum stress, a stress at rupture, a strain at rupture and a coefficient of elasticity. In addition, a ratio of the rupture point stress to the maximum point stress ((rupture point stress/maximum point stress)×100(%)) was calculated.

<Tensile Test Method>

Using a cured product, a test piece was manufactured according to the method based on the JIS K 7161-1 to measure a maximum point stress, a maximum point stretch, a stress at rupture, a stretch at rupture and a coefficient of elasticity.

<Compression Test Method>

Using a cured product, a test piece was manufactured according to the method based on the JIS K 7181 to measure a maximum point stress, a maximum point strain and a coefficient of elasticity.

Examples from 2 to 7, Comparative Examples from 1 to 4

The same operation as Example 1 was carried out to obtain respective mixtures, except for blending as shown in Table 1. The results obtained by evaluating respective mixtures obtained were shown in Table 1.

TABLE 1

|  | Example 1 | Example 2 | Example 3 | Example 4 | Example 5 | Example 6 | Example 7 | Compar. example 1 | Compar. example 2 | Compar. Example 3 | Compar. Example 4 |
|---|---|---|---|---|---|---|---|---|---|---|---|
| EP-4901E | 80 | 75 | 50 | 25 | 50 | 50 | 12.5 | 120 | 80 | 80 | 80 |
| EP-4005 | 60 | 25 | 50 | 75 | 50 | 50 | 87.5 | 20 |  |  | 60 |
| EP-4000*1 |  |  |  |  |  |  |  |  | 60 |  |  |
| EPU-11F*2 |  |  |  |  |  |  |  |  |  | 60 |  |
| LECy | 60 | 100 | 100 | 100 | 100 | 100 | 100 | 60 | 60 | 60 | 60 |

TABLE 1-continued

|  | Example 1 | Example 2 | Example 3 | Example 4 | Example 5 | Example 6 | Example 7 | Compar. example 1 | Compar. example 2 | Compar. Example 3 | Compar. Example 4 |
|---|---|---|---|---|---|---|---|---|---|---|---|
| KAYAHARD AA | 70 | 70 | 70 | 70 | 50 | 90 | 70 | 70 | 70 | 70 |  |
| JEFFAMINE T-403*3 |  |  |  |  |  |  |  |  |  |  | 70 |
| Usable time | good | good | good | good | good | good | good | good | good | good | poor |
| Bend test |
| Muximum point stress (MPa) | 122.4 | 148.1 | 141.3 | 128.0 | 141.5 | 137.4 | 114.4 | 149.6 | 142.0 | 133.8 | — |
| Strain at the muximum stress (%) | 5.7 | 4.7 | 6.0 | 5.4 | 6.2 | 5.7 | 5.3 | 8.2 | 6.0 | 6.0 | — |
| Stress at rupture (MPa) | 85.7 | 148.1 | 114.6 | 91.2 | 131.9 | 123.2 | 81.3 | 133.3 | 132.3 | 129.7 | — |
| Strain at rupture (%) | 11.7 | 4.7 | 10.3 | 10.9 | 8.3 | 8.4 | 11.0 | 9.4 | 8.0 | 7.0 | — |
| Coefficient of elasticity (MPa) | 3515.0 | 4055.0 | 3719.0 | 3574.0 | 3794.0 | 3809.0 | 3468.0 | 3812.0 | 3742.0 | 3454.0 | — |
| Rupture point stress/ muximum point stress | 70.0 | 100.0 | 81.1 | 72.4 | 93.2 | 89.7 | 71.1 | 89.1 | 93.2 | 96.9 | — |
| Tensile test |
| Muximum point stress (MPa) | 83.9 | 85.8 | 97.6 | 86.1 | 92.4 | 94.7 | 80.1 | 66.0 | 40.1 | 60.6 | — |
| Stretch at the muximum stress (%) | 4.0 | 3.0 | 4.6 | 4.0 | 4.3 | 4.4 | 3.9 | 2.6 | 1.4 | 2.5 | — |
| Stress at rupture (MPa) | 83.2 | 85.8 | 92.9 | 71.3 | 92.4 | 80.2 | 53.9 | 66.0 | 40.1 | 60.6 | — |
| Stretch at rupture (%) | 4.1 | 3.0 | 5.6 | 6.1 | 4.3 | 6.5 | 5.6 | 2.6 | 1.4 | 2.5 | — |
| Coefficient of elasticity (MPa) | 3130.0 | 3196.0 | 3167.0 | 3021.0 | 3027.0 | 3101.0 | 2876.0 | 3015.0 | 3036.0 | 2817.0 | — |
| Compression test |
| Muximum point stress (MPa) | 125.5 | 153.4 | 136.3 | 122.3 | 131.1 | 126.9 | 116.3 | 133.7 | 144.9 | 149.9 | — |
| Coefficient of elasticity (MPa) | 2497.0 | 3207.0 | 3161.0 | 2852.0 | 2917.0 | 2721.0 | 2765.0 | 2270.0 | 2846.0 | 2589.0 | — |

*1EP-4000: an epoxidized material of bisphenol A propylene oxide average 1 equivalent addition product (a compound wherein the average values of (a) and (b) correspond to 1 respectively in the structural formula of general formula (1)), manufactured by ADEKA CORPORATION, epoxy equivalent: 320 g/eq.
*2EPU-11F: urethane-modified epoxy resin, manufactured by ADEKA CORPORATION, epoxy equivalent: 320 g/eq.
*3JEFFAMINE T-403: polyether framework-containing aliphatic polyamine manufactured by Huntsman Corporation.

As is clear from the Table 1, it was confirmed that the usable time was good in the resin composition of the present invention, and all items of bend test, tensile test and compression test were good in the cured product of resin composition of the present invention. In the cured products obtained by curing the resin compositions in Comparative examples from 1 to 3, items of bend test and compression test were good. However, with respect to items of tensile test, the maximum point stress and the stretch at the maximum stress were lower than the case of the present invention, therefore, sufficient results could not be obtained. In comparative example 4, since the usable time was short, workability was markedly-decreased, as a result, subsequent tests were not carried out.

Example 8

25 g of ADEKA RESIN EP-4901E and 75 g of ADEKA RESIN EP-4005 as an epoxy resin (A), 100 g of LECy as a cyanate resin (B), and 70 g of KAYAHARD AA as an aromatic amine cured product (C) that is liquid at 25° C. were introduced in a 500 ml disposable cup to stir with a spatula at 25° C. for 5 minutes. After that, further stirring was carried out using a sun-and-planet stirring machine to obtain a mixture.

100 g of glass fiber (UDR S14EU970-01190-00100-100000, manufactured by SAERTEX GmbH & Co. KG) was impregnated with 33 g of mixture obtained, using a roller. With respect to the glass fiber impregnated with resin, curing properties and the state of fiber surface were measured in the way hereinafter prescribed. Evaluated results were shown in Table 2.

Figure 1:
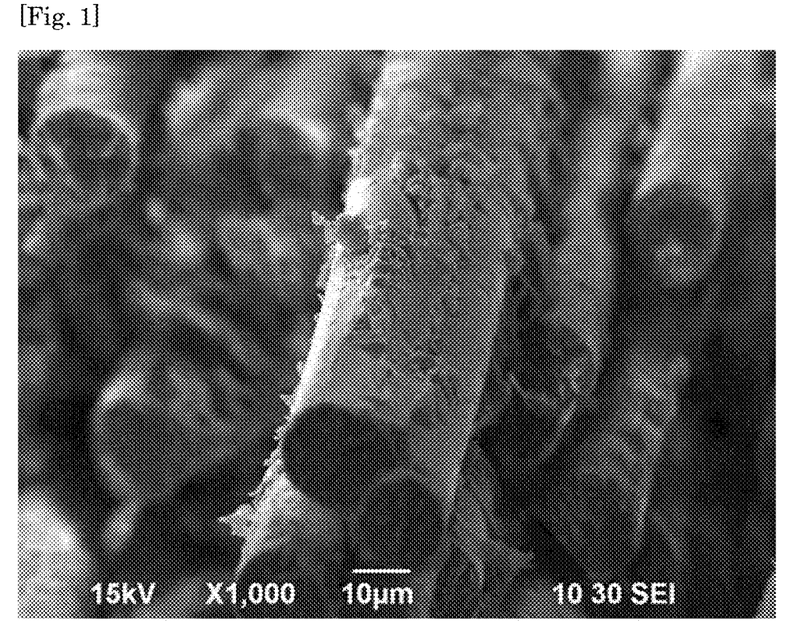
FIG. 1 is a figure substituted for photograph indicating the state of evaluation A in the confirmation test of fiber surface state.
Figure 2:
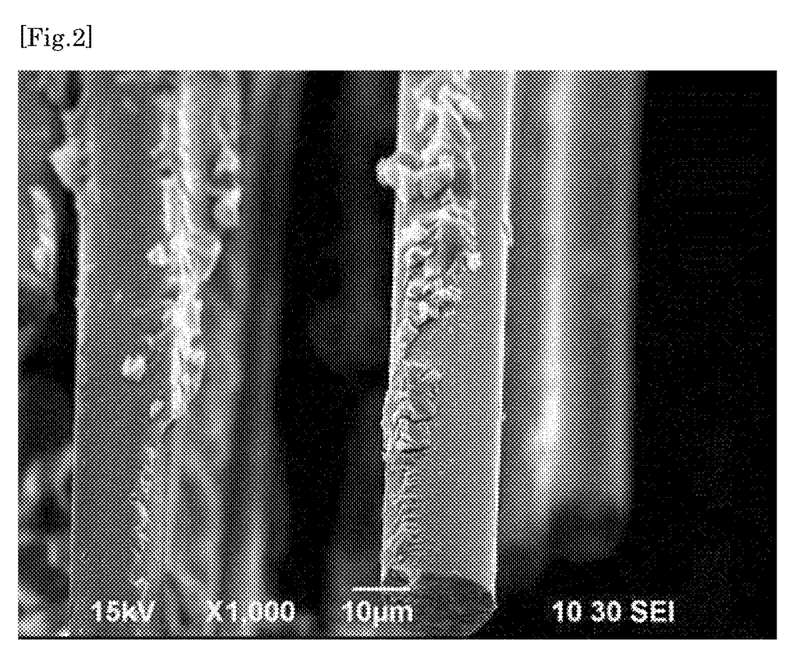
FIG. 2 is a figure substituted for photograph indicating the state of evaluation B in the confirmation test of fiber surface state.
Figure 3:
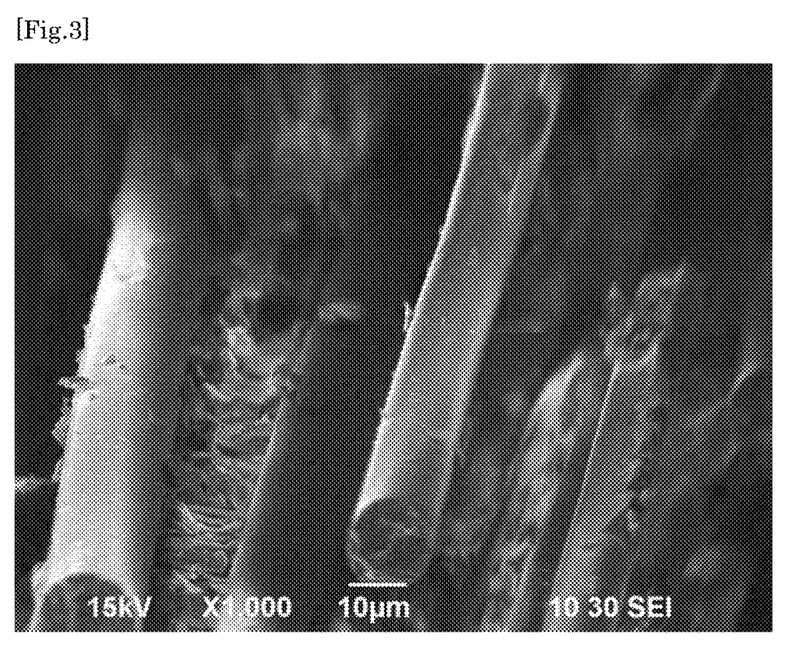
FIG. 3 is a figure substituted for photograph indicating the state of evaluation C in the confirmation test of fiber surface state.

<Curing Properties>
The glass fiber impregnated with resin was put in a constant temperature water tank at 150° C. to measure by feel the curing time until said glass fiber became tack-free.
<State of Fiber Surface>
With respect to the resin fiber complex after the resin curing (fiber-reinforced plastic) which was obtained at the time of confirming the curing properties as above stated, the bend test was carried out according to the method based on the JIS K 7017. The cross-sectional surface of fiber-reinforced plastic ruptured by the bend test was confirmed as below, using the scanning electron microscope (DSC 6220, manufactured by Seiko Instruments Inc.).
A: Resin adheres to the whole of fiber surface.
B: Resin adheres to a part of fiber surface.
C: Resin hardly adheres to the fiber surface.
In the case of A or B, the resin cured product is in the state of cohesive failure at the time of rupture by the bend test, and it can be confirmed that the cured product and the fiber tightly adhere each other. In the case of the state of C, the resin cured product and the fiber are in the state of interfacial peeling at the time of rupture in the bend test, and it can be confirmed that the cured product and the fiber did not tightly adhere each other. The evaluation of A or B was deemed as an acceptance. The states from A to C were shown in Figs from 1 to 3 respectively.

Examples from 9 to 16, Comparative Examples from 5 to 8

With respect to the glass fiber impregnated with resin, curing properties and the state of fiber surface were measured by carrying out the same operation as Example 8, except for blending as shown in Table 2 or Table 3. Evaluated results were shown in Table 2 and Table 3 respectively.

TABLE 2

|  | Example 8 | Example 9 | Example 10 | Example 11 | Example 12 | Example 13 | Example 14 | Example 15 | Example 16 |
|---|---|---|---|---|---|---|---|---|---|
| EP-4901E | 25 | 50 |  | 50 | 50 | 50 | 50 | 50 | 50 |
| EP-4005 | 75 | 50 | 100 | 50 | 50 | 50 | 50 | 50 | 50 |
| LECy | 100 | 100 | 100 | 100 | 100 | 100 | 100 | 100 | 100 |
| KAYAHARD AA | 70 | 70 | 70 | 70 | 70 | 70 | 70 | 70 | 70 |
| EP-4088S*4 |  |  |  | 2.7 | 5.4 | 10.8 |  |  |  |
| KBM-403*5 |  |  |  |  |  |  | 2.7 | 5.4 | 10.8 |
| Curing time (hr) | 3 | 3 | 3 | 3 | 3 | 3 | 3 | 3 | 3 |
| Evaluation of fiber surface conditions | B | B | B | A | A | A | A | A | A |

*4EP-4088S: dicyclopentadiene type epoxy resin manufactured by ADEKA CORPORATION
*5KBM-403: γ-glycidoxypropyl triethoxy silane manufactured by Shin-Etsu Chemical Co., Ltd.

TABLE 3

|  | Comparative example 5 | Comparative example 6 | Comparative example 7 | Comparative example 8 |
|---|---|---|---|---|
| EP-4901E | 100 |  |  | 50 |
| EP-4005 |  |  |  | 50 |
| EP-4000 |  | 50 | 100 |  |
| LECy | 100 | 100 | 100 | 100 |
| KAYAHARD AA | 70 | 70 | 70 |  |
| EH-3636AS *6 |  |  |  | 70 |
| Curing time (hr) | 3 | 3 | 3 | Uncured |
| Evaluation of fiber surface conditions | C | C | C | — |

*6 EH-3636AS: powdery dicyandiamide type latent curing agent manufactured by ADEKA CORPORATION As is clear from the results of Table 2, it was confirmed that the fiber reinforced plastic using the resin composition of the present invention cures at 150° C. for 3 hours and the resin cured product adheres tightly to the fiber when verifying the state of fiber surface after the bend test. This proves that, when the fiber is stretched by the bend test, the resin cured product can adapt to the stretch of fiber.

In addition, in Examples from 11 to 13 wherein the dicyclopentadiene type epoxy resin was added in the resin composition as an additive agent, and also in Examples from 14 to 16 wherein the silane coupling agent was added in the resin composition as an additive agent, it was confirmed that adhesive properties were further improved by increasing the amount of additive agent.

As is clear from Table 3, in the case of Comparative examples from 5 to 7 using the resin composition wherein the compound indicated by the general formula (1) is not used, the curing time was the same as the case of Examples using the resin composition of the present invention. However, it was confirmed that the resin cured product did not adhere tightly to the fiber surface of which state was verified after the bend test and the interfacial peeling from the fiber surface was caused on the cured resin product. In addition, in the case of Comparative example 8, since the resin composition was not cured, the subsequent tests could not be carried out. As a reason for the fact that the resin composition was not cured, it can be thought that the powdery latent curing agent could not permeate into the inside gaps existing among fibers, and as a result, it remains on the fiber surface, which causes poor curing.

Example 17

25 g of ADEKA RESIN EP-4901E and 75 g of ADEKA RESIN EP-4005 as an epoxy resin (A), 100 g of LECy as a cyanate resin (B), 70 g of KAYAHARD AA as an aromatic amine curing agent (C) that is liquid at 25° C. and 0.27 g of NUBIAN BLACK TN-870 (a nigrosine black dye manufactured by Orient Chemical Industries Co., Ltd.) as an active energy radiation absorbable component (D) were introduced in a 500 ml disposable cup to stir with a spatula at 25° C. for 5 minutes. After that, further stirring was carried out using a sun-and-planet stirring machine to obtain a mixture.

100 g of glass fiber (UDR S14EU970-01190-00100-100000, manufactured by SAERTEX GmbH & Co. KG) was impregnated with 33 g of mixture obtained, using a roller. The glass fiber impregnated with the resin composition was irradiated with the laser beam (output power: 10 W, wavelength of light: 915 nm), and the irradiation time of laser beam until said glass fiber became tack-free was measured by feel. Evaluated results were shown in Table 4.

After the resin composition was cured, the state of fiber surface of glass fiber (fiber-reinforced plastic) was evaluated in the same manner as Examples from 8 to 16.

Example 18

With respect to the fiber-reinforced plastic obtained by curing, the irradiation time of infrared rays was measured and the state of fiber surface of glass fiber were verified by carrying out the same operation as Example 17, except that the glass fiber impregnated with the resin composition was irradiated with the infrared rays, using a halogen heater (QIR 200V 2000 W/444, manufactured by Iwasaki Electric Co., Ltd.) instead of a laser beam.

Example 19

With respect to the fiber-reinforced plastic obtained by curing, the irradiation time of infrared rays was measured and the state of fiber surface of glass fiber were verified by carrying out the same operation as Example 17, except that the glass fiber impregnated with the resin composition was irradiated with the infrared rays, using a ceramic heater (FFE-1000, manufactured by NIPPON HEATER CO., LTD.) instead of a laser beam.

Example 20

With respect to the fiber-reinforced plastic obtained by curing, the irradiation time of infrared rays was measured and the state of fiber surface of glass fiber were verified by carrying out the same operation as Example 17, except that the glass fiber impregnated with the resin composition was irradiated with the infrared rays, using a quartz heater (FQE-650, manufactured by NIPPON HEATER CO., LTD.) instead of a laser beam.

Examples 21 and 22

With respect to the fiber-reinforced plastic obtained by curing, the irradiation time of laser beam was measured and the state of fiber surface of glass fiber were verified by carrying out the same operation as Example 17, except for blending according to the composition shown in Table 4.

Examples 23 and 24

With respect to the fiber-reinforced plastic obtained by curing, the irradiation time of infrared rays was measured and the state of fiber surface of glass fiber were verified by carrying out the same operation as Example 18, except for blending according to the composition shown in Table 4.

Example 25

With respect to the fiber-reinforced plastic obtained by curing, the curing time until the glass fiber becomes tack-free by feel was measured and the state of fiber surface of glass fiber were verified by carrying out the same operation as Example 17, except that the glass fiber impregnated with the resin composition was cured in a constant temperature water tank at 150° C. instead of a laser beam.

Examples from 26 to 28

With respect to the fiber-reinforced plastic obtained by curing, the irradiation time of a laser beam was measured and the state of fiber surface of glass fiber were verified by carrying out the same operation as Example 17, except for blending according to the composition shown in Table 4.

Comparative Example 9

The same operation as Example 17 was carried out except for blending without NUBIAN BLACK TN-870. However, the resin was not cured in spite of being irradiated with a laser beam for 3 hours. Therefore, the subsequent evaluations were not made.

As is clear from the results of Table 4, it was confirmed that, with regard to the fiber reinforced plastic using the resin composition of the present invention wherein the active energy radiation absorbable component (D) is contained, the resin cured product adheres tightly to the fiber. This proves that, when the fiber is stretched by the bend test, the resin cured product can adapt to the stretch of fiber. In addition, it was confirmed that, in Examples of the present invention wherein the curing was carried out by the active energy radiation, the resin can be cured in a very short time compared to the curing by heat. Furthermore, it was confirmed that, in the cases of Example 23 wherein the dicyclopentadiene type epoxy resin is added in the resin composition and Example 24 wherein the silane coupling agent is added in the resin composition as an additive agent, adhesive properties are further improved.

INDUSTRIAL APPLICABILITY

The resin composition of the present invention has the long usable time and all components of the composition can penetrate into the inside of gaps existing among the fibers, therefore, the fiber-reinforced plastic of the present invention having excellent heat resistance and strength can be provided. The fiber-reinforced plastic of the present invention can be applied to various use applications such as an automobile, a ship, a windmill blade, a roof material and sporting goods. Therefore, the present invention is extremely useful in the industrial field.

The invention claimed is:

1. A resin composition for fiber reinforced plastic, comprising an epoxy resin (A), a cyanate resin (B) and an aromatic amine curing agent that is liquid at 25° C. (C), wherein 20 to 97 percent by mass of the aforementioned epoxy resin (A) is an epoxy compound expressed by the following general formula (1);

wherein (a) and (b) each independently express an integer from 2 to 10, (c) expresses an integer from 0 to 3, $R^1$ and $R^2$ each independently express a bivalent hydrocarbon group

TABLE 4

| | Example 17 | Example 18 | Example 19 | Example 20 | Example 21 | Example 22 | Example 23 | Example 24 | Example 25 | Example 26 | Example 27 | Example 28 | Com. example 9 |
|---|---|---|---|---|---|---|---|---|---|---|---|---|---|
| EP4901E | 50 | 50 | 50 | 50 | 50 | 50 | 50 | 50 | 50 | 50 | 50 | 50 | 50 |
| EP4005 | 50 | 50 | 50 | 50 | 50 | 50 | 50 | 50 | 50 | 50 | 50 | 50 | 50 |
| LECy | 100 | 100 | 100 | 100 | 100 | 100 | 100 | 100 | 100 | 100 | 100 | 100 | 100 |
| KAYAHARD AA | 70 | 70 | 70 | 70 | 70 | 70 | 70 | 70 | 70 | 70 | 70 | 70 | 70 |
| NUBIAN BLACK TN-870 | 0.27 | 0.27 | 0.27 | 0.27 | 0.81 | 1.35 | 0.27 | 0.27 | | 0.27 | 0.135 | 0.068 | 0.027 |
| EP-4088S*1 | | | | | | | | 10.8 | | | | | |
| KBM-403*2 | | | | | | | | 10.8 | | | | | |
| Irradiation time of laser beam/infrared rays (sec.) | 0.25 | 27 | 75 | 90 | 27 | 27 | 27 | 27 | — | 1.3 | 2 | 2.7 | Uncured |
| Curing time (hr) | — | — | — | — | — | — | — | — | 3 hours | — | — | — | — |
| Evaluation of fiber surface conditions | B | B | B | B | B | B | A | A | B | B | B | B | — |

*1EP-4088S: dicyclopentadiene type epoxy resin manufactured by ADEKA CORPORATION
*2KBM-403: γ- glycidoxypropyl triethoxysilane manufactured by Shin-Etsu Chemical Co., Ltd.

having 2 to 5 carbon atoms, and $R^3$ expresses a single bond, a methylene group or —C(CH$_3$)$_2$—, and wherein 3 to 15 percent by mass of dicyclopentadiene type epoxy resin is contained in the aforementioned epoxy resin (A).

2. The resin composition for fiber reinforced plastic according to claim 1, wherein the cyanate resin (B) comprises at least one compound selected from a group consisting of compound expressed by the following general formula (2-1), a compound expressed by the following general formula (2-2), and prepolymers thereof;

(2-1)

wherein, $R^a$ indicates a bivalent hydrocarbon group, $R^b$ and $R^c$ each independently indicate an unsubstituted phenylene group or a phenylene group substituted by 1 to 4 alkyl groups;

(2-2)

wherein, (n) indicates an integer from 1 to 10, $R^d$ indicates a hydrogen atom, or an alkyl group having 1 to 4 carbon atoms.

3. The resin composition for fiber reinforced plastic according to claim 1, wherein the cyanate resin (B) is at least one compound selected from a group consisting of the compound expressed by the following general formula (2-3), and the prepolymer thereof;

(2-3)

wherein $R^e$ indicates a single bond, a methylene group, —CH(CH$_3$)—, —C(CH$_3$)$_2$—, or any one of functional groups indicated by the following general formulae from (3-1) to (3-8), $R^f$, $R^g$, $R^h$ and $R^i$ each independently indicate a hydrogen atom, or an alkyl group having 1 to 4 carbon atoms

(3-1)

(3-2)

(3-3)

(3-4)

(3-5)

(3-6)

(3-7)

(3-8)

in this regard, (m) in the above general formula (3-3) indicates an integer from 4 to 12.

4. The resin composition for fiber reinforced plastic according to claim 1, wherein the amount of cyanate resin (B) used is 50 to 120 parts by mass relative to 100 parts by mass of the total amount of epoxy compound containing an epoxy group in the composition.

5. The resin composition for fiber reinforced plastic according to claim 1, wherein the aromatic amine curing agent (C), which is liquid at 25° C., is at least one compound selected from diaminodiphenylmethane, diaminodiethyl diphenylmethane, and diaminodiethyltoluene.

6. The resin composition for fiber reinforced plastic according to claim 1, wherein the amount used of the aromatic amine curing agent (C), which is liquid at 25° C., ranges from 40 to 90 parts by mass relative to 100 parts by mass of the total amount of epoxy compound having an epoxy group in the composition.

7. The resin composition for fiber reinforced plastic according to claim 1, wherein a silane coupling agent is further contained.

8. The resin composition for fiber reinforced plastic according to claim 7, wherein the amount of the silane coupling agent used ranges from 7 to 20 parts by mass relative to 100 parts by mass of the total amount of epoxy compound having an epoxy group in the composition.

9. A cured product obtained by curing the composition containing the resin composition for fiber reinforced plastic according to claim 1.

10. A high-strength fiber-reinforced plastic obtained by curing the composition which uniformly contains the resin composition for fiber reinforced plastic according to claim 1 and a reinforcement fiber.

11. A resin composition for fiber reinforced plastic, comprising an epoxy resin (A), a cyanate resin (B) and an aromatic amine curing agent that is liquid at 25° C. (C), wherein 20 to 100 percent by mass of the aforementioned epoxy resin (A) is an epoxy compound expressed by the following general formula (1);

(1)

wherein (a) and (b) each independently express an integer from 2 to 10, (c) expresses an integer from 0 to 3, $R^1$ and $R^2$ each independently express a bivalent hydrocarbon group having 2 to 5 carbon atoms, and $R^3$ expresses a single bond, a methylene group or —$C(CH_3)_2$—, and wherein an active energy radiation absorbable component (D) is further contained.

12. The resin composition for fiber reinforced plastic according to claim 11, wherein the active energy radiation absorbable component (D) is a nigrosine compound.

13. The resin composition for fiber reinforced plastic according to claim 11, wherein the amount of the active energy radiation absorbable component (D) used ranges from 0.001 to 1 percent by mass relative to the total amount of the resin composition.

14. A method for producing a high-strength fiber-reinforced plastic, wherein the composition, which uniformly contains the resin composition for fiber reinforced plastic according to claim 11 and a reinforcement fiber, is cured by the active energy radiation.

15. The method for producing the high-strength fiber-reinforced plastic according to claim 14, wherein the active energy radiation used is a laser beam and/or infrared rays.

* * * * *